UNITED STATES PATENT OFFICE.

BRUNO RICHARD SEIFERT, OF RADEBEUL, NEAR DRESDEN, GERMANY, ASSIGNOR TO CHEMISCHE FABRIK VON HEYDEN AKTIENGESELLSCHAFT, OF RADEBEUL, NEAR DRESDEN, GERMANY.

PROCESS OF MAKING GUANYL DIALKYL BARBITURIC ACID.

No. 808,407.     Specification of Letters Patent.     Patented Dec. 26, 1905.

Application filed July 6, 1905. Serial No. 268,528. (Specimens.)

*To all whom it may concern:*

Be it known that I, BRUNO RICHARD SEIFERT, a subject of the King of Saxony, and a resident of Albertstrasse 6, Radebeul, near Dresden, Kingdom of Saxony, German Empire, have invented a new and useful Improved Manufacture of Guanyl Dialkyl Barbituric Acids, of which the following is a specification.

The present invention has for its object a process of making guanyl dialkyl barbituric acids.

It has been found that when treating dialkyl malonic acid esters and dioyan diamidin with alkali alcoholates or with condensing agents acting in the same manner new bodies are obtained, which probably represent the guanyl dialkyl barbituric acids, unknown till now, and which on heating with acids give dialkyl barbituric acids. The formation probably takes place according to the following equation:

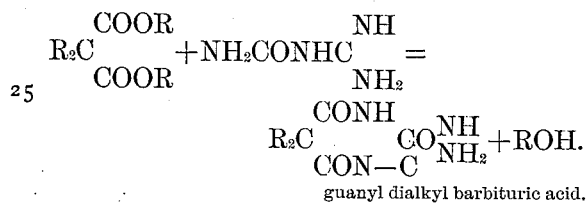

guanyl dialkyl barbituric acid.

Example: 80.5 parts, of weight, of sodium are dissolved in thirteen hundred parts, of weight, of absolute alcohol and boiled with two hundred and sixteen parts, of weight, of diethyl malonic ethyl ester and one hundred and fifty-two parts, of weight, of hydrochloric dicyan diamidin for five to six hours under reflux, or better heated in a closed boiler to 105° centigrade. After the reaction is finished the product is slightly acidulated with hydrochloric acid, the resulting precipitate is filtered off and by treating with water freed from salt. The remaining guanyl diethyl barbituric acid on boiling with mineral acids gives diethyl barbituric acid. Guanyl diethyl barbituric acid is easily soluble in hot mineral acids and alkalies, difficultly soluble in alcohol. From diluted hot hydrochloric acid it crystallizes in well-developed prisms.

Instead of the diethyl malonic acid ethyl ester mentioned in the example other dialkyl malonic acid dialkyl esters, and instead of the sodium alcoholate condensing agents of analogous action, for example, sodium amid or sodium metal, may be employed.

I claim—

Process of making guanyl dialkyl barbituric acid, which consists in heating dicyan diamidin and dialkyl malonic acid dialkyl esters with a suitable condensing agent as sodium alcoholate, substantially as described.

In testimony that I claim the foregoing as my invention I have signed my name, in presence of two witnesses, this 21st day of June, 1905.

BRUNO RICHARD SEIFERT.

Witnesses:
  PAUL ARRAS,
  PAUL E. SCHILLING.